(12) United States Patent
Gattiglio et al.

(10) Patent No.: US 8,076,610 B2
(45) Date of Patent: Dec. 13, 2011

(54) LASER PUNCHING MACHINE

(75) Inventors: Maurizio Gattiglio, Turin (IT); Michele de Chirico, Alpignano (IT)

(73) Assignee: Prima Industrie S.p.A., Collegno (Torino) (IT)

( * ) Notice: Subject to any disclaimer, the term of this patent is extended or adjusted under 35 U.S.C. 154(b) by 1063 days.

(21) Appl. No.: 11/576,221

(22) PCT Filed: Sep. 22, 2005

(86) PCT No.: PCT/IB2005/002979
§ 371 (c)(1),
(2), (4) Date: Sep. 20, 2007

(87) PCT Pub. No.: WO2006/035307
PCT Pub. Date: Apr. 6, 2006

(65) Prior Publication Data
US 2008/0156777 A1    Jul. 3, 2008

(30) Foreign Application Priority Data

Sep. 28, 2004  (IT) ............... TO2004A0647

(51) Int. Cl.
*B23K 26/00* (2006.01)
(52) U.S. Cl. .............. 219/121.7; 219/121.71; 219/121.6
(58) Field of Classification Search ............... 219/121.7, 219/121.71, 121.6, 121.85
See application file for complete search history.

(56) References Cited

U.S. PATENT DOCUMENTS 6,408,045 B1 * 6/2002 Matsui et al. .................. 378/34
7,886,629 B2 * 2/2011 Sartorio .................... 74/490.09

* cited by examiner

*Primary Examiner* — M. Alexandra Elve
(74) *Attorney, Agent, or Firm* — Heslin Rothenberg Farley & Mesiti, P.C.; Victor A. Cardona, Esq.

(57) ABSTRACT

Punching machine for the execution of holes on metal plates comprising a laser cutting head slidably supported by a pair of slides movable along a pair of Cartesian axes in a relatively restricted space with high velocities and accelerations. Movable balancing masses are operatively associated to the first and to the second slide.

6 Claims, 5 Drawing Sheets

LASER PUNCHING MACHINE

CROSS REFERENCE TO RELATED APPLICATIONS

This application is a 371 national stage filing of PCT International Application No. PCT/IB2005/002979, filed on 22 Sep. 2005, and published in English on 6 Apr. 2006, as WO 2006/035307, which claims priority to Italian Patent Application No. TO2004A000647 filed on 28 Sep. 2004, the entire disclosures of all of which are incorporated herein by reference.

FIELD OF THE INVENTION

The present invention relates to punching machines for executing holes on metal plates.

SUMMARY OF THE INVENTION

The object of the invention is to provide an apparatus lacking the traditional mechanical punching tools (punches and dies) and able to operate, with respect to conventional punching machines, in extremely more rapid and precise fashion and without appreciable vibrations.

According to the invention, said object is achieved thanks to the fact that the punching machine comprises:
- a stationary support structure below which the metal plate can be positioned and moved,
- a movable equipment borne by the support structure and including a first and a second slide, linearly movable along a pair of mutually orthogonal Cartesian axes, bearing respective sliding guides directed orthogonally to the respective axes of movement, and a laser cutting head with vertical axis adapted to address a focused laser beam on the metal plate and provided with cursors able to move along said guides, in such a way that the movement of each slide along the related Cartesian axis produces a corresponding movement of the laser head relative to the other slide,
- first and second actuator means to actuate the movements of said first and second slide, respectively, in a relatively restricted space with high velocities and accelerations, and
- balancing means with movable balancing masses operatively associated to said first and second slide.

Thanks to this solution idea, the operations of holing the metal plates, performed by means of the punching machine according to the invention are effected by the laser cutter head with limited travels and extremely high dynamic performance, whilst reducing the vibrations deriving from the movements of the movable equipment to substantially negligible levels.

According to a preferred embodiment of the invention, for each of said first and second slide is provided a respective balancing mass linearly movable, by respective actuator means, in opposite direction to the direction of movement of the related slide, with equal velocities and accelerations.

BRIEF DESCRIPTION OF THE DRAWINGS

The present invention shall now be described in detail with reference to the accompanying drawings, provided purely by way of non limiting example, in which.

DETAILED DESCRIPTION OF THE INVENTION

Figure 5:
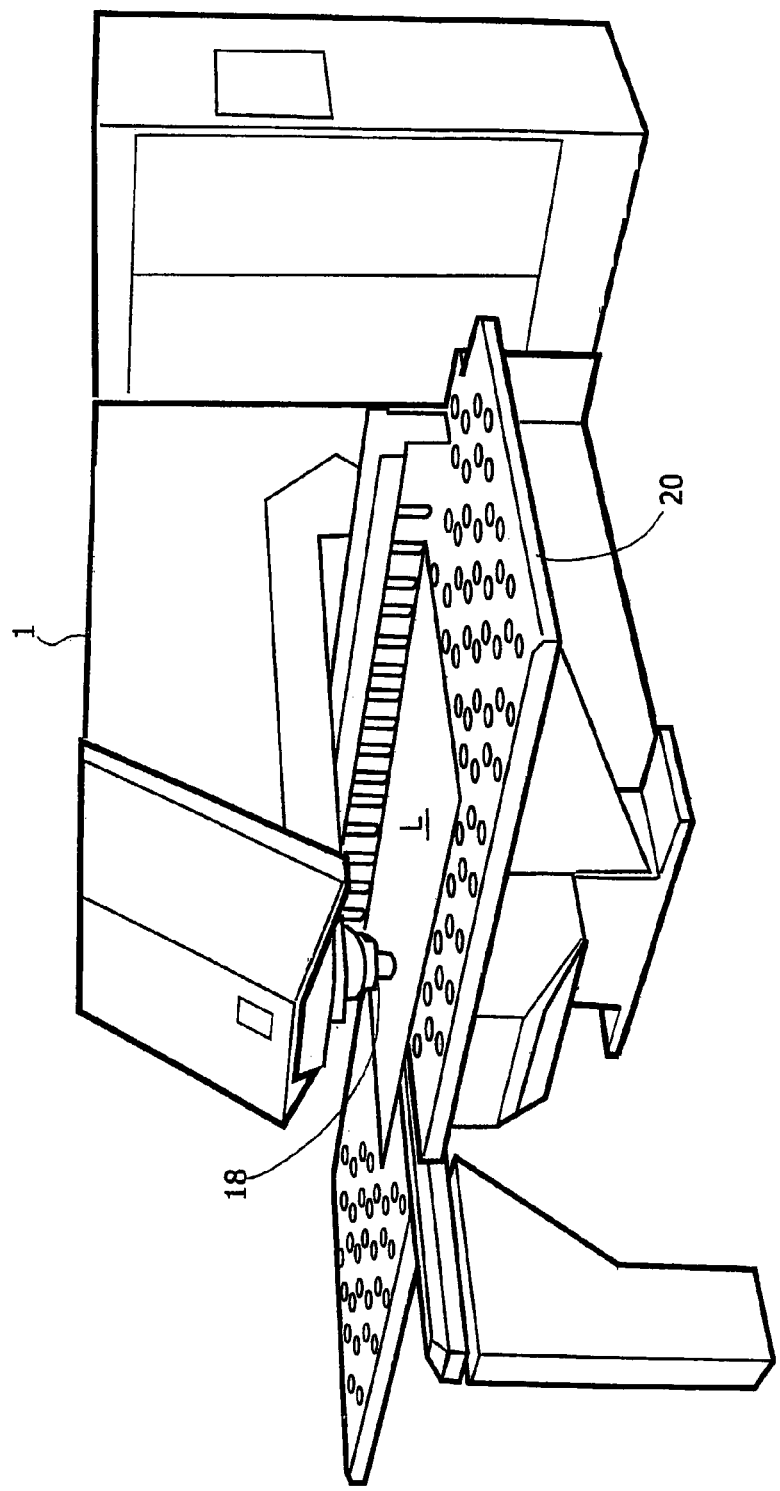
FIG. 5 is a global schematic perspective view of the laser punching machine.

With reference to the drawings, the punching machine according to the invention comprises a stationary support structure, generically designated with the reference number 1, situated above a work bench 20 (FIG. 5) whereat can be positioned and horizontally movable a metal plate L whereon holes are to be executed.

The support structure 1 in turn bears a pair of guide blocks 2, 3 inferiorly provided with respective sliding guides (not shown) along which are engaged in slidable fashion shoes 4, 5 borne respectively by a first slide 6 and by a second slide 7.

Figure 2:
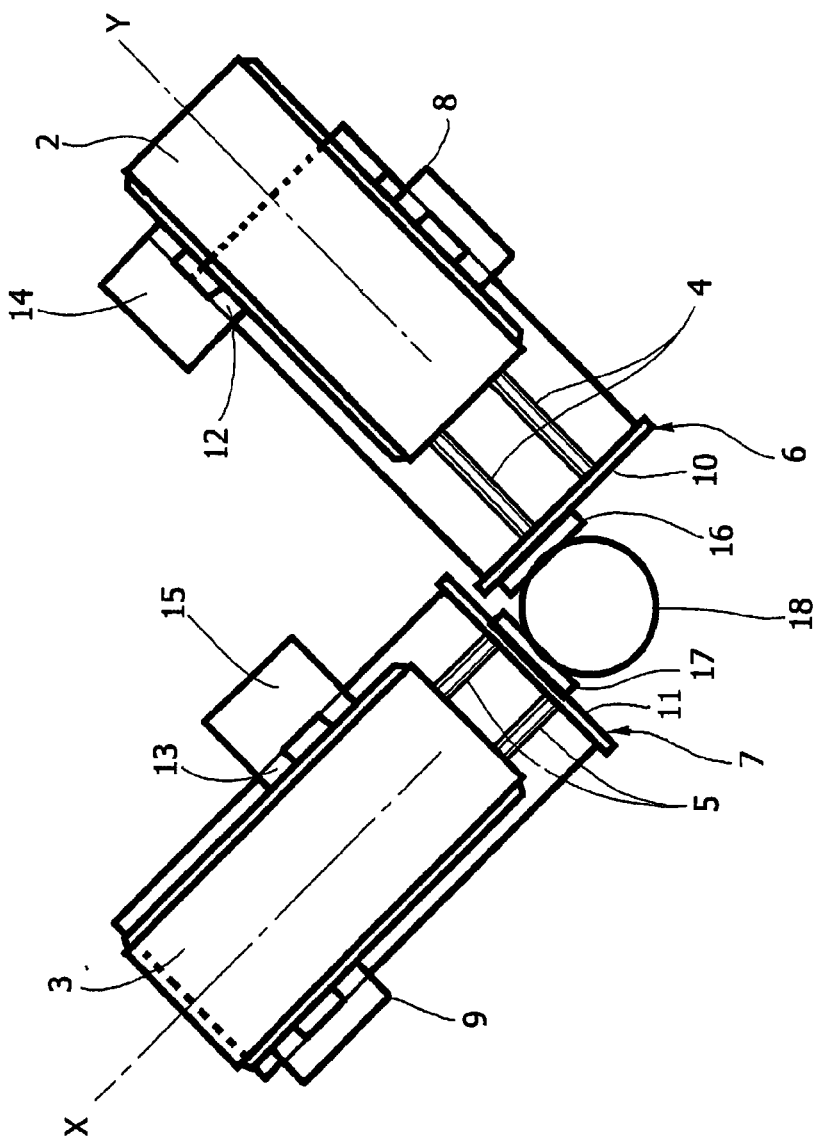
FIG. 2 is a top plan view of FIG. 1.
Figure 4:
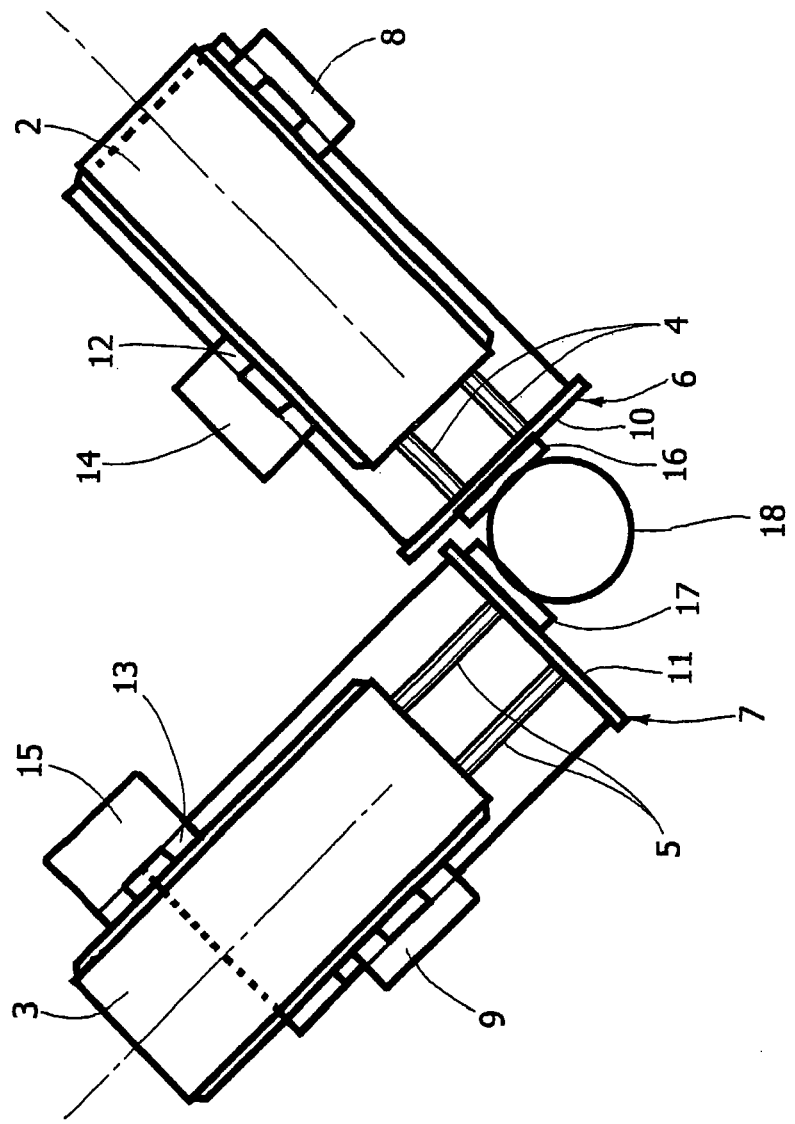
FIG. 4 is a top plan view of FIG. 3.

The slides 6, 7 are linearly movable relative to the blocks 2, 3 along two mutually orthogonal Cartesian axes respectively designated with the references Y and X (FIGS. 2 and 4). The movement of each slide 6, 7 is operated by means of a respective actuator 8, 9, normally electrical, constituted for example by a linear or rotary electric motor with screw and lead screw transmission, or the like.

To allow partial superpositions between the slides 6, 7 during their movements along the respective axes Y and X, said slides 6, 7 are slightly offset vertically relative to each other.

The two slides 6, 7 bear, at the respective front sides, respective guides 10, 11 whereon is slidable a laser cutting head 18 with vertical axis, provided in generally known manner with an optical system (e.g. reflection or fibre optics) associated with a laser source and for focusing said laser beam, designated by the reference F, on the metal plate L. The laser head 18 is provided with a pair of lateral cursors 16, 17, e.g. constituted by shoes or carriages, movable along the front guides 10 and 11 of the slides 6 and 7.

The motors 8 and 9 are operatively connected to a numeric control unit, not shown herein (or described in detail, as it is known to those skilled in the art) which commands its operation according to pre-determined programmes as a function of the machining needs for the metal plate L. Said programmes shall be adapted to effect the coordinated movements of the laser cutting head 18 along the axes X and Y in continuous fashion, within a relatively restricted space and with extremely high velocities and accelerations.

To high accelerations of the laser cutting head 18 would generally correspond high vibration levels transmitted by said laser head 18 and by the slides 6, 7 to the support structure 1 of the punching machine.

In order drastically to reduce said vibrations to nearly negligible values, the invention provides for the presence of a balancing system with movable balancing masses operatively associated to the slides 6 and 7. In the case of the illustrated example, said movable balancing masses are designated by the references 14 and 15 and they are movable, by means of respective electric actuators 12, 13 similar to the actuators 8, 9, each in opposite direction to the direction of movement of the related slide 6, 7 associated thereto, with equal velocity and acceleration. In other words, when for example the slide 6 is made to advance to move the laser cutting head 18 along the axis Y, the related balancing mass 14 is made to move rearwards parallel to the axis Y, as stated with equal velocity and acceleration.

Obviously, the actuators 12 and 13 are also operatively connected to the programmable control unit of the actuators 8 and 9, so that all masses moving during the machining of the metal plate L will be coordinated to assure continuity of motion.

Figure 1:
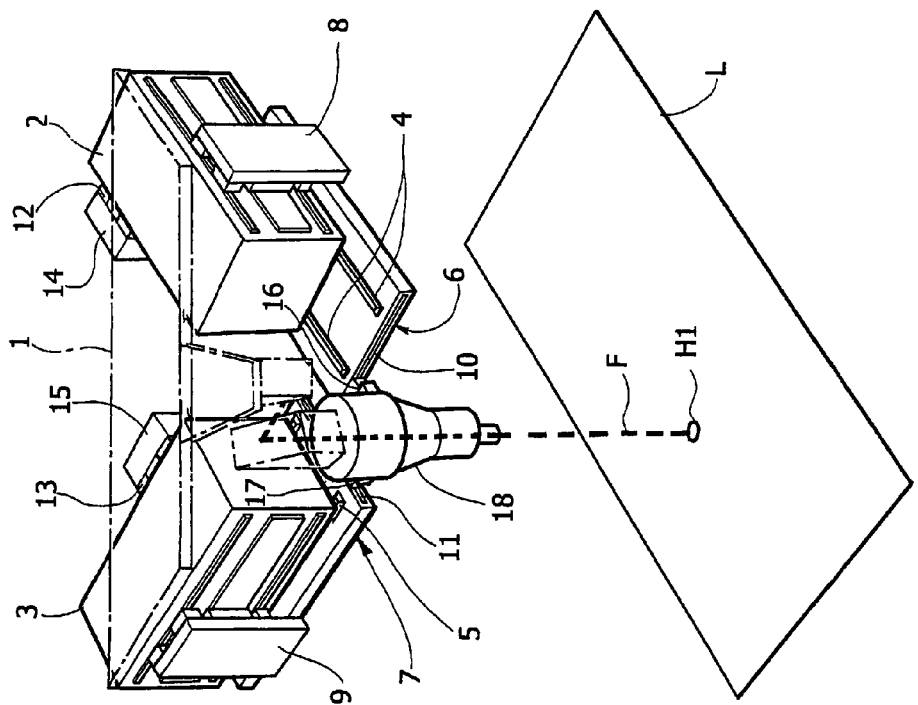
FIG. 1 is a perspective schematic, simplified view of the cutting head of a laser punching machine according to the invention shown in a first operative condition.
Figure 3:
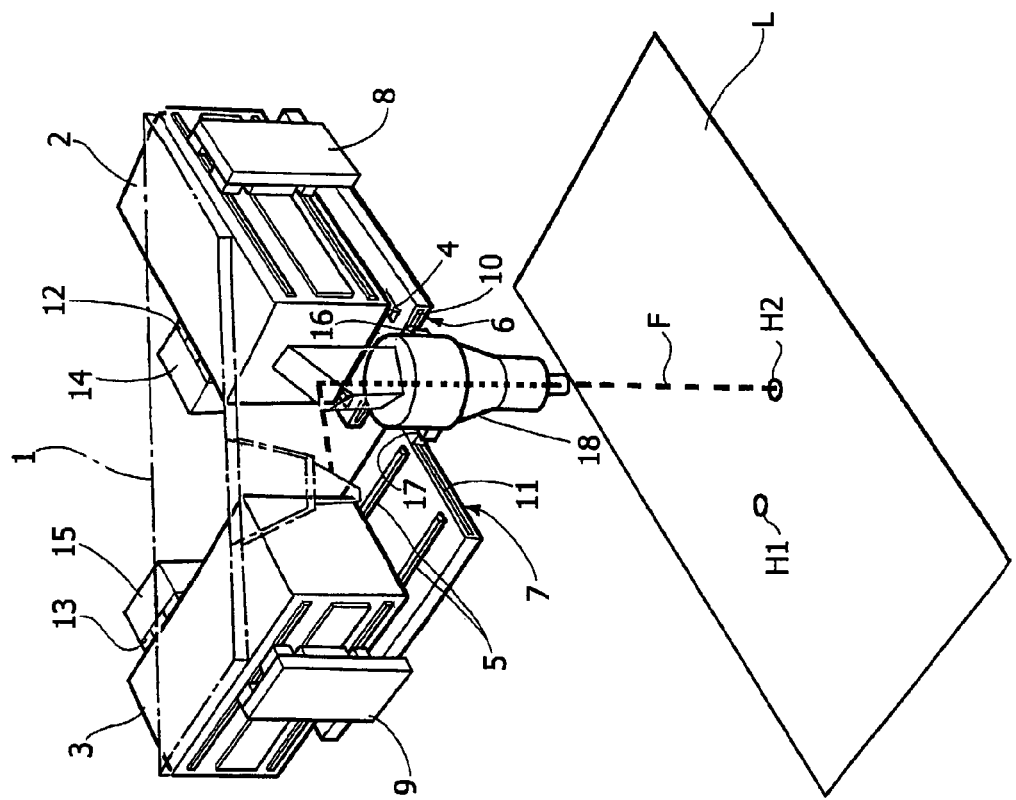
FIG. 3 is a view similar to FIG. 1 which shows the cutting head of the laser punching machine according to the invention shown in a second operative condition.

FIGS. 1 and 2 are a first possible positioning of the laser cutting head 18 operated by effect of the motion of the slides 6, 7, whereto correspond, as stated, contrary positionings of the balancing masses 14, 15 for effecting a first hole H1, and FIGS. 3 and 4 show a different positioning for effecting an additional hole H2.

It should be noted that the position and configuration of the balancing masses 14, 15 could vary from those illustrated herein: for example, they may be borne in overhang from respective arms extending below the slides 6, 7, each orthogonally to the direction of movement of the corresponding slide.

Naturally, without altering the principles of the invention, the construction components and the embodiments may be widely varied from what is described and illustrated herein without thereby departing from the scope of the present invention as defined in the claims that follow.

The invention claimed is:

1. A punching machine for executing holes on metal plates, comprising:
    a stationary support structure below which a metal plate can be positioned and moved,
    a movable equipment supported by the support structure and including a first slide and a second slide, linearly movable along a pair of mutually orthogonal Cartesian axes and bearing respective sliding guides directed orthogonally to the respective axes of movement, and a laser cutting head having a vertical axis and configured to focus a laser beam on the metal plate, said laser head being provided with cursors able to move along said guides, in such a way that the movement of each slide of said first slide and said second slide along the related Cartesian axis produces a corresponding movement of the laser head relative to the other slide,
    first and second actuators to actuate the movement of said first slide and said second slide, respectively, in a relatively restricted space with high velocities and accelerations;
    balancing means with movable balancing masses operatively associated to said first and second slide; and
    wherein each of said first slide and said second slide comprises a respective balancing mass, linearly movable, by respective third and fourth actuators, in opposite direction to the direction of movement of the related slide of said first slide and said second slide, with equal velocities and accelerations.

2. The punching machine as claimed in claim 1, wherein said first slide and said second slide are vertically offset relative to each other.

3. The punching machine as claimed in claim 1, wherein said first and second actuators to command the movements of said first slide and said second slide, and said third and fourth actuators to command the movements of said balancing masses, include electronically controlled electric motors.

4. The punching machine as claimed in claim 1, wherein said first slide and said second slide are vertically offset relative to each other.

5. The punching machine as claimed in claim 1, wherein said first and second actuators to command the movements of said first slide and said second slide, and said third and fourth actuators to command the movements of said balancing masses, include electronically controlled electric motors.

6. The punching machine as claimed in claim 2, wherein said first and second actuators to command the movements of said first slide and said second slide, and said third and fourth actuators to command the movements of said balancing masses, include electronically controlled electric motors.

* * * * *